United States Patent

Campanella

[15] 3,652,981
[45] Mar. 28, 1972

[54] PROXIMITY WARNING AND COLLISION AVOIDANCE SYSTEMS

[72] Inventor: Angelo J. Campanella, 3201 Ridgewood Drive, Columbus, Ohio 43220

[22] Filed: Apr. 13, 1970

[21] Appl. No.: 28,353

[52] U.S. Cl. ............................. 340/25, 340/24, 343/112 CA
[51] Int. Cl. ............................................................. G01j 1/28
[58] Field of Search ............................................. 340/23–28; 244/77 D; 343/112.4 CA

[56] References Cited

UNITED STATES PATENTS

| | | |
|---|---|---|
| 3,267,470 | 8/1966 | Riggs........................343/112.4 CA |
| 3,551,676 | 12/1970 | Runnels...................................340/25 |
| 3,113,211 | 12/1963 | Thews.........................343/112.4 CA |
| 3,412,402 | 11/1968 | Beckwith....................343/112.4 CA |

*Primary Examiner*—Kathleen H. Claffy
*Assistant Examiner*—William A. Helvestine
*Attorney*—Cennamo, Dunbar & Kremblas

[57] ABSTRACT

This is an inflight aircraft warning system of advising a pilot of relative danger of collision with another aircraft. Sensor and display means are provided for indicating the presence, direction, and the rate of closeness of an approaching aircraft.

7 Claims, 9 Drawing Figures

PATENTED MAR 28 1972 3,652,981
SHEET 1 OF 2
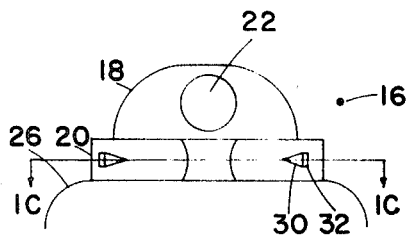
FIG. 1B
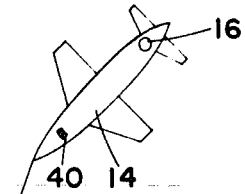
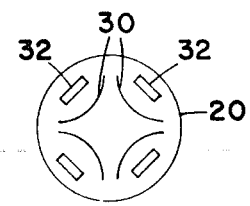
FIG. 1C
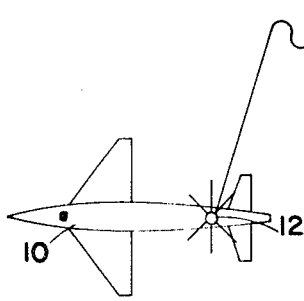
FIG. 1A
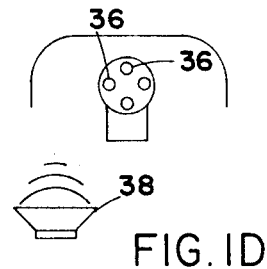
FIG. 1D
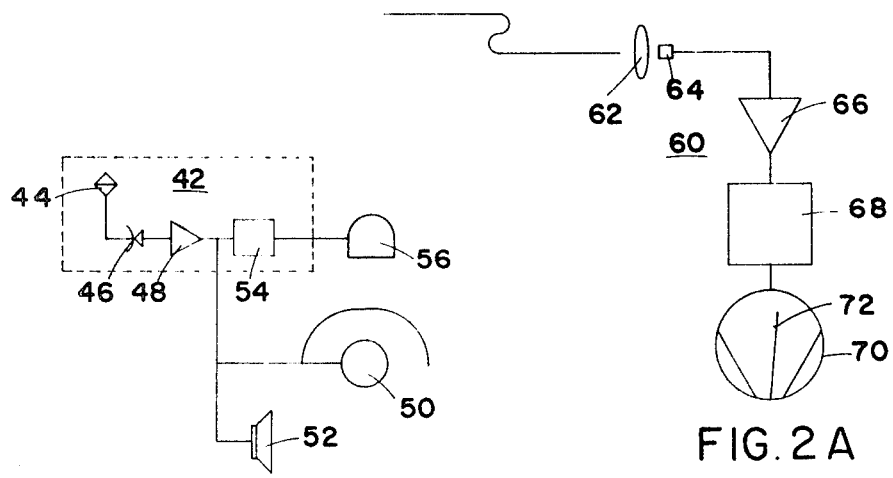
FIG. 2B    FIG. 2A
INVENTOR
ANGELO J. CAMPANELLA
BY *Cennamo, Dunbar & Kremblas*
ATTORNEY

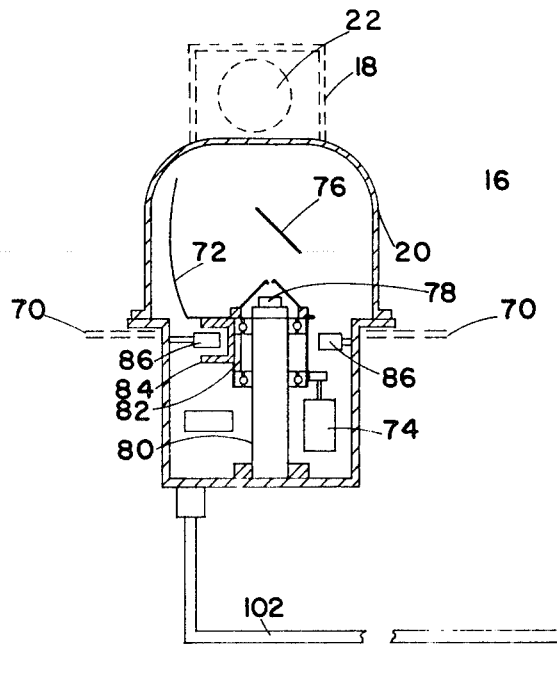
FIG 3A
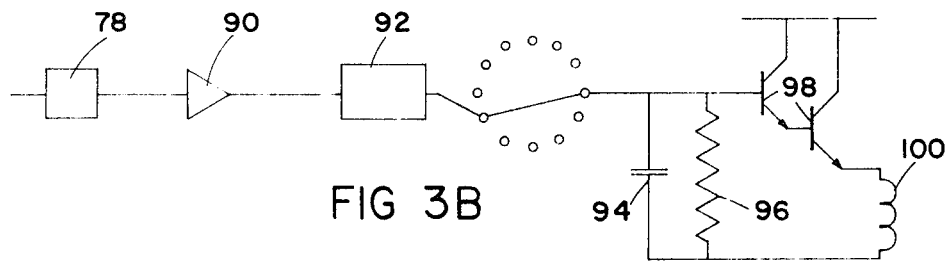
FIG 3B
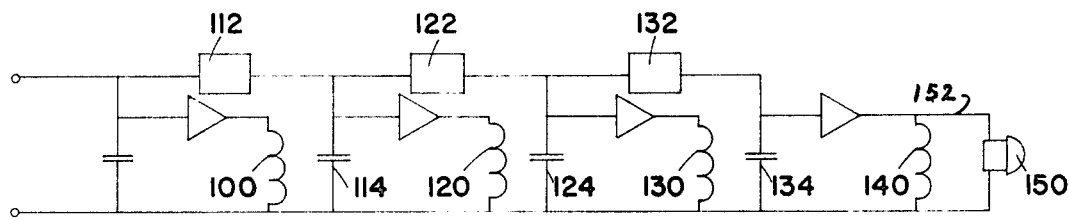
FIG 3C
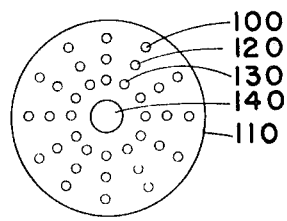
INVENTOR
ANGELO J. CAMPANELLA
BY *Cennamo, Dunbar & Kremblas*
ATTORNEY

PROXIMITY WARNING AND COLLISION AVOIDANCE SYSTEMS

BACKGROUND OF THE INVENTION

Aircraft in flight are not always positioned relatively with a visible reference object and the pilots of aircraft in the same vicinity have no real means of determining the probability of collision. The only means employed at present is visual observation whether the other aircraft appears to grow larger or smaller.

However, when visibility is poor, as during bad weather conditions, twilight conditions as at dawn and dusk, and during nighttime, each pilot must rely entirely upon relative movement of the visible lights which form a part of the standard equipment of all aircraft. Unfortunately, pronounced relative movement of any light on another aircraft with respect to the pilot's position in his aircraft signifies only a situation in which danger of collision is relatively small.

It appears evident that with congestion to aircraft on the increase every year, the probability of collision courses of planes becomes such that despite the vast, unobstructed area of the sky, a startling number of collision courses may actually occur in a day's time in the foreseeable future. When it is further considered that a significant percentage of converging courses can result in collisions, the problem becomes of such gravity that a solution therefore must be found. This solution must be far more reliable than simple "eyeball" observation. The achievement of complete collision avoidance has proven to be beyond the human capabilities of the pilots, even with care and alertness. Achievement of complete collision avoidance, however, is possible with the following.

OBJECTS OF THE INVENTION

It is accordingly a principal object of the present invention to provide a new and improved instrument-type of aircraft collision warning system.

It is another object of the invention to provide an aircraft collision warning system that does not rely on visual observation.

Another object of the invention is to provide a pilot with a collision warning system that determines the azimuthal position of the other airborne aircraft.

Another object of the invention is to provide a pilot with an aircraft collision warning system that is dependable, irrespective of the time of day or climatic conditions.

Still another object of the invention is to provide an improved instrument-type aircraft warning system that is extremely rugged, reliable and sufficiently inexpensive for widespread use.

SUMMARY DESCRIPTION OF THE INVENTION

The present invention is for an in-flight approaching aircraft warning system. The invention principally comprises a sensor for detecting the flashing lights of another aircraft. The optical detection is conveyed to an instrument having a multiplicity of visual indicators for indicating the radial position of the approaching aircraft. The indicators are further operable by its sequence of flashing to indicate the direction and the rate of closure of a nearby aircraft.

The above and other objects and advantages of the invention will become apparent upon full consideration of the following detailed description and accompanying drawings in which:

FIG. 1A shows a pair of aircraft in flight using the apparatus of the present invention;

FIG. 1B is a system embodying the present invention in which a composite flasher-sensor installation is shown;

FIG. 1C is a cross-sectional view taken along lines C-1C of FIG. 1B;

FIG. 1D is a cockpit display for the simple proximity warning system of FIGS. 1B and 1C;

FIG. 2A shows a radar E/O transponder adapted to provide a proximity warning system;

FIG. 2B shows a further modification of the invention shown in FIG. 2A;

FIG. 3A is a schematic diagram of a sensor and display system for proximity warning and collision avoidance, according to the preferred embodiment of the present invention;

FIG. 3B shows the electronic circuit connecting the photo cell to the lamps of the display means, according to the preferred embodiment of the invention shown in FIG. 3A; and FIG. 3C shows modification and supplemental units or devices that are superimposed on the display means, also according to a preferred embodiment of the invention.

DETAILED DESCRIPTION OF THE INVENTION

Referring now to the drawings, there is shown in FIG. 1A an aircraft 10 having a flashlamp or "strobe" lamp 12 which emits a flash in repetitive fashion, such as one flash per second or even at a greater rate of repetition. Another aircraft 14 is provided on its upper rear fuselage a flash sensor system 16, as is more particularly shown as a composite flasher and sensor installation in FIGS. 1B and 1C.

FIG. 1B shows a transparent dome 18 and a transparent housing 20, being transparent throughout the entire azimuth range. Within the transparent dome 18 is a flash lamp or strobe light or strobe lamp 22 for emitting a flash in azimuth, as well as in elevation above the mounting of its transparent dome on the housing, which is in turn mounted on the aircraft structure 26.

The transparent housing 20 mounted on the aircraft structure 26 includes a series of sensor means shown in FIG. 1C, as including a light-gathering and focusing device 30, such as a lens or preferably such as a curved mirror reflecting means for focusing light therefrom to a photo electric sensor 32. The focusing devices 30,30 are distributed about the azimuth so that the complete or entire azimuth pattern is seen, so that an entire solid angle in azimuth is realized.

From each of the photo electric sensors 32,32 is coupling means to an electronic current amplifier (not shown) of conventional construction for providing pulse current to a corresponding array of lamps 36,36 in the aircraft's cockpit for indicating or displaying to the pilot the azimuthal angle that the threat aircraft is located with reference to his own direction. It is within the scope of the invention to provide more subdivisions than the four shown in FIGS. 1B and 1C, so that the cockpit display for the pilot shown in FIG. 1D may be divided further accordingly within the teachings of the present invention.

Alternatively, an aural tone may also be sent from the output of the photo electric sensors 32,32 into the aircraft's voice communication audio system (not shown) for producing a tone over a transducer 38 in the cockpit. When such tone is heard from the transducer 38, the pilot needs only to observe the lamp display 36 to observe the direction of an apparent threat of collision.

In mounting the flash sensor 16 on the aircraft, such locations as the top of the vertical stabilizer may be available for providing the most angular coverage; or other locations on top of the fuselage on the bottom of the fuselage, or on wing tips, are possible where pairs thereof are used.

In order to discriminate against the aircraft's own flash, the sensor 16 would include a clipping or blanking circuit for clamping out or rejecting the pulse at the time its own strobe lamp 22 is emitting. The flash duration of the strobe lamp may vary from dozens of microseconds to about 1 millisecond, so that at a flash rate of one per second this would provide a 0.1 percent blanking time. Since various aircraft may be found to be flashing without synchronism, the probability that a receiver will be blanked when another aircraft flashes will be extremely small.

In cases where a proximity warning indicator and collision avoidance system is sought to be desirable so that the pulsed lamps 16 are triggered by the airborne radar, i.e., E/O transponder, the arrangement according to FIGS. 2A and 2B is contemplated. Such systems provide a more definitive indication and display of threat aircraft location in a manner compatible with existing cockpit equipment. In such cases, aircraft 14 shown in FIG. 1A would carry an airborne search weather radar 40 which scans the horizontal plane in its forward direction. This scan in azimuth may be as large as 100° in which range span most, if not all, threats are expected to occur. The vertical coverage would be the same as described above, or similar to conventional weather radar, i.e., 3°-5° vertical. A threat aircraft such as aircraft 10 in the example to be considered in describing FIGS. 2A and 2B carries a radar pulse receiver of a simple form called a crystal video receiver 42 which comprises an omnidirectional antenna 44 whose gain, impedance and efficiency favor the C, X, and $K_u$ bands common to conventional airborne radar systems. The R. F. radar energy as received in the omnidirectional antenna 44 is fed to a crystal rectifier 46 where it is detected as a pulse envelope of 1-3 microseconds, which is amplified by amplifier 48 where it is applied to trigger a warning lamp 50 mounted in the cockpit of the aircraft 10. The trigger pulse applied to the lamp 50 may also be applied to a transducer or loudspeaker 52 also in the cockpit, the trigger pulse is also applied to electronic circuit 54 for energizing a flash lamp 56. Aircraft 14 also carries a flash lamp electro-optical receiver 60, shown in FIG. 2A, having a field of view which is aligned with and slews with the radar antenna of search radar 40. In a simple form, this electro-optical receiver may have a field of view sufficiently large to include the entire solid azimuth angle swept out by the radar beam of aircraft 14. When the flash lamp 56 fires, light is received by the electro-optical receiver 60 through a lens 62 which focuses the light on a light sensor 64 which provides a current pulse to amplifier 66 for feeding the signal derived thereby to a radar video process unit 68 which is coupled to a radar display 70 of conventional construction. The PPI presentation on the radar display 70 of the conventional and existing radar system displays the light flash as a pulse which is sufficiently long enough that it places a long stripe 72 along the azimuthal angle of the threat aircraft 10 so that a pilot can derive collision avoidance information from this stripe. When the azimuth angle does not change with time, he knows that he is on a collision course with aircraft 14. Aircraft 10 may then be turned to a heading where the line-of-sight rate changes continuously with time. Another useful maneuver would have aircraft 10 establish the relative altitude of aircraft 14 by tilting the radar beam 40 up and down and noting where the return on the radar display 70 disappears.

A further and preferred embodiment of the present invention is shown in FIGS. 3A - 3C in which a sensor and display system for proximity warning and collision avoidance systems is available. It is particularly in this preferred embodiment that the flash lamp may be pulsed a few times per second. When the intruding aircraft's presence is already known, flashing a few times a minute is sufficient for proximity monitoring purposes. The sensor and display system as illustrated in FIG. 3A would be carried by each aircraft 10,14 so that the sensor 16 in FIG. 3A comprises a transparent dome 18 having a flash lamp 22, and a transparent housing 20, such as have been described in connection with FIG. 1B. The housing 20 is mounted on the skin 70 of the aircraft or by other means (not shown), and within the housing 20 is a rotatable assembly including a primary mirror 72 which is rotated in azimuth at a rate of approximately 15 r.p.m. by a drive motor 74. The primary mirror 72 receives light from a flash lamp 22 of a different aircraft, which will flash at a rate of 180 flashes per minute. As this light is received by the primary mirror, a folding mirror 76 passes the received light from the primary mirror to a photocell 78 which is mounted on a column 80 containing electronic circuitry and system components, as shown in FIGS. 3B and 3C. Column 80 provides means 82 for rotating the assembly formed of the primary mirror, the folding mirror and a magnet 84 which is U-shaped.

During the course of its circular revolution about the column 80, the permanent magnet 84 engages a series of magnetic reed switches 86 which may be 12 or more in number. When twelve reed switches are provided, the azimuth is divided into fields of view of 30° in azimuth. This angle is provided by the FOV aperture over the photocell. It will always be possible to receive pulses from aircraft at any azimuth angle. The FOV of 30° divides the azimuth into twelve equal parts, thus providing a "POINTS-OF-THE-CLOCK" arrangement which is already familiar to pilots in interpreting relative angle information during flight.

The photocell which may be a photo semiconductor device or a photomultiplier sensor which produces electric current when light is incident upon its sensitive surface. The light pulse is thus converted into the form of a signal current pulse to an amplifier 90, which in turn triggers an astable or one-shot multivibrator circuit or pulse stretcher 92 that receives a nominal one millisecond E/O pulse and shapes it to a nominal 100 millisecond low impedance pulse suitable for charging a large storage capacitor 94 to which it is coupled through a single-pole-multiple-throw magnetic reed switch 86. The capacitor 94 discharges through a resistance 96 and is coupled in turn through current amplifier stages 98 to a lamp 100 which is one of a plurality of display lamps, which is panel-mounted as a display means in the cockpit of the aircraft. The display means is coupled to the electronic circuitry in the column 80 by means of a multiconductor signal and power cable 102.

In operation, assuming that the aircraft are disposed as shown in FIG. 1A so that aircraft 10 is located at an 11 O'clock position with reference to aircraft 14, it will be seen that a pulse is received by the primary mirror 72 when it is rotating and is in its 11 O'clock position. When the primary mirror 72 is in the 11 O'clock position, the magnetic reed switch 86 is in magnetic coupling with the permanent magnet 84 of FIG. 3A, so that the magnetic reed switch 86 of FIG. 3B is closed and any developed signal of the circuit of FIG. 3B is applied to the lamp 100 by means of the commutation of the single-pole-multiple-throw magnetic reed switches 86. There is then provided the necessary azimuth information for proper display to the pilot in the cockpit of the aircraft. It is within the scope of the present invention to construct and dispose the 12 magnetic reed switches in a vacuum or other hermetically sealed structure to assure proper operation thereof. It is also within the scope of the present invention in the alternative to use 12 microswitches that are cam actuated upon rotation of the assembly formed by the primary mirror 72-structure 82, as rotated by the motor 74. For surety purpose in the operation of the magnetic switch arrangement 86, a "make-before-break" action may be preferred.

Thus it is seen that at the instant the aircraft 14 receives a pulse from the flash 12 of the aircraft 10, and when the primary mirror 72 is in alignment to such position, assuming it to be its 11 O'clock position, the 11 O'clock reed switch 86 is closed and the signal energy pulse is fed to the 11 O'clock display lamp 100.

In the preferred form shown in FIG. 3B, the display means comprises a circular array of 12 lamps about a circle suitable for mounting within a 3-inch standard instrument space on the aircraft cockpit control panel. Each lamp is fed similarly by a cascaded emitter-follower current amplifier 98 having its input containing a large storage capacitor 94 shunted by an equivalent resistor 96, as above described, such that the RC time-constant of the input circuit is essentially equal to one rotation period or about 4 seconds. Thus, when the 11 O'clock position switch 86 was closed, the output from the low impedance pulse stretcher and amplifier arrangement 90,92 charges the capacitor 94 to a full supply voltage value of, for example, 12 volts. The lamp 100, when the switch 86 is closed, illuminates to a full brilliance at first and then dims slowly as the capacitor 94 discharges. It is essential and a concept of the present invention that the initial flash catches the eye of the pilot in the cockpit, and then when he looks for the lamp that has flashed, it will still have enough brightness due to the long RC time constant for him to identify which point of the clock of the display means 110 carries the illuminated lamp indicative that a potential threat of collision is present. The operator then can either immediately look for the target outside of his cockpit window or refocus his attention on the display indicator means 110 to see whether the same lamp flashes again. If it does, he may then turn his aircraft 14 to a new heading to put the potential threat of collision in a less dangerous aspect, as may appear on subsequent observations of the display panel 110.

There is provided in the arrangement shown in the modification of FIG. 3C, a display means and accompanying circuit arrangement in which two or more, for example, three concentrically arranged circles of lamps are used in the display means 110. Thus, an outer lamp 100 on the display means 110 is illuminated indicating a warning or collision condition. The residual electrical charge on the capacitor 94 closes a polarity sensitive switch 112 for charging a second capacitor 114 so that upon the next scan in the 11 O'clock position, the switch 112 is closed for charging capacitor 114, which in turn illuminates lamp 120 in addition to lamp 100 being illuminated so that two lamps are now energized and provide attention-getting brilliance. The charge on capacitor 114 similarly actuates or closes polarity sensitive switch 122 so that upon the third sweep, the same target would light three lamps including lamp 130 upon the discharge of capacitance 124. Now, if the target is in the warning or collision position with respect to the 11 O'clock position, as detected by the primary mirror, then three lights 100, 120, 130 are illuminated, and a further stage of polarity sensitive switch and light circuit may be arranged to illuminate a very bright centrally disposed lamp 140 on the display means 110, which in turn may be coupled in parallel with an oral warning tone in the communication audio system, such as by a KLAXON horn 150 disposed in the cockpit. Since lamp 140 and the horn 150 are an omnidirectional indication of a warning or collision condition, the polarity sensitive switch 132 is coupled at its output and with the corresponding point of the other similar electrical stages at terminal 152, as shown in FIG. 3C, so that after energization of the third lamp of the other stages, the lamp 140 and the horn 150 are energized. This arrangement is significant because location of a threat on the same azimuth for an extended period of time indicates constant bearing angle which satisfies one well-known criterion for collision intercept. If, on the other hand, the threat's azimuth changes from one point of the clock to the next, then the fourth step of energizing the lamp 140 and the horn 150 thus will not occur.

Additional embodiments of the invention in this specification will occur to others and therefore it is intended that the true spirit of the invention be limited only by the appended claims and not by the embodiments described hereinabove. Accordingly, reference should be made to the following claims in determining the true spirit of the invention.

What is claimed is:

1. An aircraft proximity warning and collision avoidance system comprising a sensor system for receiving light flashes having means for concentration of said flashes upon a photocell sensor, said concentration means includes a rotatable primary mirror for receiving said flashes, a folding mirror to direct said flashes from said rotatably primary mirror to said photocell sensor, said sensor system positioned to receive such pulses within an approximate restricted zone of 3° to 10° in elevation and throughout the entire azimuth of said aircraft, said photocell sensor producing a signal current pulse representative of said pulses to a pulse stretcher for producing a low impedance charging pulse, and coupling means for applying said charging pulse to a display means.

2. The invention according to claim 1 wherein said coupling means includes a drive motor to rotate said primary mirror, a magnet supported from the primary mirror, a plurality of magnetic reed switches mounted in serial relation to the passing of said rotating magnet, and a corresponding plurality of R-C circuits with a lamp load to which the charging pulses are applied for indicating the receipt of flashes, said primary mirror receiving segmented portions of the azimuth, for example 30°, so that the display means includes said plurality of lamp loads indicative of said segmented portions of the azimuth.

3. The invention according to claim 2 wherein said mirror means is mounted within a transparent dome; said photocell sensor, switches, R-C circuits and drive means are located in an adjoining housing for being mounted to an aircraft structure and supporting said mirror means and said transparent dome.

4. The invention according to claim 3 wherein said display means is mounted in the pilot's compartment of said aircraft.

5. The invention according to claim 4 wherein an audio alarm is energized upon repetitive energization of lamps in a given azimuth relation on said display means.

6. An aircraft proximity warning and collision avoidance system comprising a sensor system in a search aircraft for receiving light flashes from a threat aircraft having means for concentration of said flashes upon a photocell sensor, said concentration means includes a rotatable primary mirror for receiving said flashes, a folding mirror to direct said flashes from said rotatable primary mirror to said photocell sensor, said sensor system positioned to receive such pulses within an approximate restricted zone of 3° to 10° in elevation and throughout the entire azimuth of said aircraft, said photocell sensor producing a signal current pulse representative of said pulses to a pulse stretcher for producing a low impedance charging pulse; a radar system including a transmitter in a search aircraft for transmitting a radio frequency pulse and a receiver in a threat aircraft for receiving said pulse, a flash lamp on said threat aircraft, and means for utilizing said received pulse to trigger said flash lamp; a Plan-Position-Indicator system, and means for applying said photocell charging pulse to said Plan-Position-Indicator to visually indicate the presence and direction of said threat aircraft.

7. The invention according to claim 6 wherein the sensor system responds to a radar signal in the C or X or $K_u$ bands of the spectrum, a crystal rectifier for detecting the radar signal producing a trigger pulse to energize a cockpit warning light.

* * * * *